(12) United States Patent
Ernst et al.

(10) Patent No.: US 6,543,408 B1
(45) Date of Patent: Apr. 8, 2003

(54) INTERNAL COMBUSTION ENGINE WITH DIRECT FUEL INJECTION

(75) Inventors: Johannes Ernst, Baden-Baden (DE); Bernhard Heel, Lauterbourg (FR); Rolf Klenk, Stuttgart (DE); Frank Otto, Esslingen (DE); Klaus Rössler, Altbach (DE); Guido Vent, Oppenweiler (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/936,340
(22) PCT Filed: Feb. 17, 2000
(86) PCT No.: PCT/EP00/01298
§ 371 (c)(1),
(2), (4) Date: Feb. 6, 2002
(87) PCT Pub. No.: WO00/55480
PCT Pub. Date: Sep. 21, 2000

(30) Foreign Application Priority Data

Mar. 12, 1999 (DE) .......................... 199 11 023

(51) Int. Cl.⁷ ............................ F02B 17/00; F02B 23/10
(52) U.S. Cl. ............................ 123/295; 123/305
(58) Field of Search ........................ 123/295, 301, 123/305

(56) References Cited

U.S. PATENT DOCUMENTS

| 5,577,473 A | * | 11/1996 | Linder ........................ 123/298 |
| 5,850,816 A | * | 12/1998 | Ohsuga et al. ......... 123/295 X |
| 5,941,207 A | * | 8/1999 | Anderson et al. ........... 123/295 |
| 5,950,584 A | * | 9/1999 | Bubeck ................ 123/169 EL |

FOREIGN PATENT DOCUMENTS

| DE | 195 46 945 | 6/1997 |
| DE | 196 42 653 | 1/1998 |
| DE | 197 49 295 | 5/1999 |
| EP | 0 835 994 | 4/1998 |
| GB | 2 233 390 | 1/1991 |

* cited by examiner

Primary Examiner—Tony M. Argenbright
(74) Attorney, Agent, or Firm—Kenyon & Kenyon

(57) ABSTRACT

In internal combustion engines with direct fuel injection an injector injects fuel into the combustion chamber to form an ignitable fuel/air mixture with separately supplied combustion air, with the mixture to be ignited by a spark plug. The fuel is injected in a cone shape and the electrodes are protected from being wetted with fuel and coking if they are disposed outside the lateral surface of the conical fuel jet generated by the injection nozzle. In order to bring ignitable mixture between the electrodes and to ensure optimal operating behavior of the internal combustion engine by improving the combustion sequence, a combustion chamber configuration is provided such that the conical fuel jet is injected in a free jet which is substantially uninfluenced by the combustion chamber perimeter, and the electrodes of the spark plug project into a fuel vortex extending from the lateral surface during injection.

7 Claims, 1 Drawing Sheet

INTERNAL COMBUSTION ENGINE WITH DIRECT FUEL INJECTION

FIELD OF THE INVENTION

The present invention relates to a gasoline engine having direct fuel injection.

BACKGROUND INFORMATION

In internal combustion engines with direct fuel injection, a combustion chamber is delimited in each cylinder by a longitudinally movable piston and the inner wall of a cylinder head, with an injector injecting fuel into the combustion chamber to produce a mixture internally with separately supplied combustion air. The composition of the fuel/air mixture must be within the ignitable window in order to be ignitable using an ignition spark which can be triggered between the electrodes of a spark plug.

An internal combustion engine having direct fuel injection is described in European Published Patent Application No. 0 835 994. The internal combustion engine includes a combustion chamber having a pent-roof shape, a centrally located injector, and electrodes of the spark plug located near an admission valve. The fuel is injected in the form of a hollow cone into a piston having a cavity with a circular projecting part and strikes against the piston cavity. The fuel scattered in this manner is transported by a tumble current to the electrodes of the spark plug, the circular projecting part of the piston trough preventing the atomized fuel from being scattered in the direction of the cylinder wall, thus ensuring a stable stratified charge combustion.

An internal combustion engine having direct fuel injection is described in German Published Patent Application No. 195 46 945, the injectors of which inject the fuel in a cone shape into the combustion chamber with their injection nozzles, with the spark plug being positioned in such a way that its electrodes are outside the lateral surface of the conical fuel jet produced by the injection nozzle. In this manner, wetting of the electrodes with fuel during the injection process is avoided and carbon black deposition on the electrodes due to incompletely combusted fuel is counteracted. The electrodes are free of coking over a long period of operation, which should ensure proper operation of the internal combustion engine without misfires. In order to bring ignitable mixture between the electrodes positioned outside the conical fuel jet, the spark plug is positioned so that the ground electrode is at a small distance from the lateral surface of the conical fuel jet and the inner wall of the cylinder head runs extends parallel to the lateral surface of the conical fuel jet while forming a gap at least at the location where the electrodes of the spark plug are positioned.

A turbulent flow composed of fuel/air mixture and extends into the region of the electrodes is to result in the gap. In order to generate the turbulent flow, the inner wall must be specially shaped and the spark plug must be positioned near the injector. The injector is located in a counter borehole of the inner wall, i.e., set back from the free combustion chamber volume, which should cause the mixture vortex to arise in the region adjacent to the injection nozzle and to circulate in the hollow space which is formed between the lateral surface of the conical fuel jet and the inner wall of the cylinder head in the region of the injection nozzle. Furthermore, air displaced by the fuel injected into the combustion chamber is to flow back through the air gap between the conical fuel jet and the parallel inner wall of the cylinder head, which is also conical. As the air flows back toward the spark plug along the inner wall, further fuel particles from the conical fuel jet are to be entrained. The turbulent flow is implemented sufficiently strongly in the region near the injector to bring ignitable mixture between the electrodes of a spark plug. Therefore, the spark plug must be located near the injector.

In a convention gasoline engine having direct fuel injection, the combustion chamber perimeter, particularly that formed by the inner wall of the cylinder head, must be precisely configured at high expense to achieve the desired hydromechanical effects for forming the ignitable mixture vortices. The conventional combustion chamber configuration having the combustion chamber shape necessary for mixture vortex formation and the unavoidable location of the spark plug near the injector often cannot achieve optimal combustion and ensure the desired operating behavior of the internal combustion engine.

It is an object of the present invention to provide a gasoline engine having direct fuel injection so that the internal combustion engine functions with optimal operating behavior.

SUMMARY

In the combustion chamber configuration according to the present invention, the conical fuel jet is injected in a free jet which is substantially uninfluenced by the combustion chamber perimeter, i.e., the conical fuel jet is injected at a sufficiently great distance, particularly from the inner wall of the cylinder head, that the conical fuel jet expands in the free combustion chamber volume substantially without hydromechanical wall effects of the combustion chamber perimeter. At the same time, fuel vortices, which arise from the lateral surface of the conical jet, are formed during the injection, initially substantially composed of fuel vapor and mixing with the surrounding combustion air in the combustion chamber. The fuel vortices develop particularly distinctly if the opening angle of the conical fuel jet is between 70° and 100° and are generated by an air stream which arises in the region of the lateral surface of the conical fuel jet due to the air entrained by the fuel jet, with an air current also being generated in the opposite direction by the resulting partial vacuum. According to the present invention, the spark plugs are positioned so that the electrodes project into the fuel vortex of the free jet. The spark position of the electrodes may be at a distance of 1 mm to 15 mm from the lateral surface of the conical fuel jet.

The fuel vortex which brings ignitable mixture between the electrodes develops on the lateral surface of the free jet without effective influence of the combustion chamber perimeter, so that the shape of the combustion chamber may be designed freely. A jet-guided combustion process is present, in which wall effects of the inner wall of the cylinder head or, for example, a piston cavity, exercise hardly any influence on the formation of the mixture and the ignition. Particularly in the stratified charge operation of the internal combustion engine, when fuel injection occurs during the compression stroke and a central fuel cloud is formed in the air-filled combustion chamber, an optimal burn-through of the combustion chamber charge may be achieved with a simple combustion chamber configuration. A further advantage of the mixture formation according to the present invention is that the spark plug may be located further from the injector. The fuel vortex stably remains at the same location in the combustion chamber for a long time, so that the ignition may occur within a broad time interval, independently from the time of injection.

The free jet of fuel may be injected into the combustion chamber in the shape of a hollow cone. In this manner, the fuel vortices form in a shape particularly suitable for conveyance of mixture to the spark plug, particularly for injection at a high cylinder pressure in the compression phase during stratified charge operation. The conical fuel jet may be implemented with the shape of a hollow cone particularly easily if the injector has an injection nozzle which opens outwardly.

DETAILED DESCRIPTION

Figure 1:
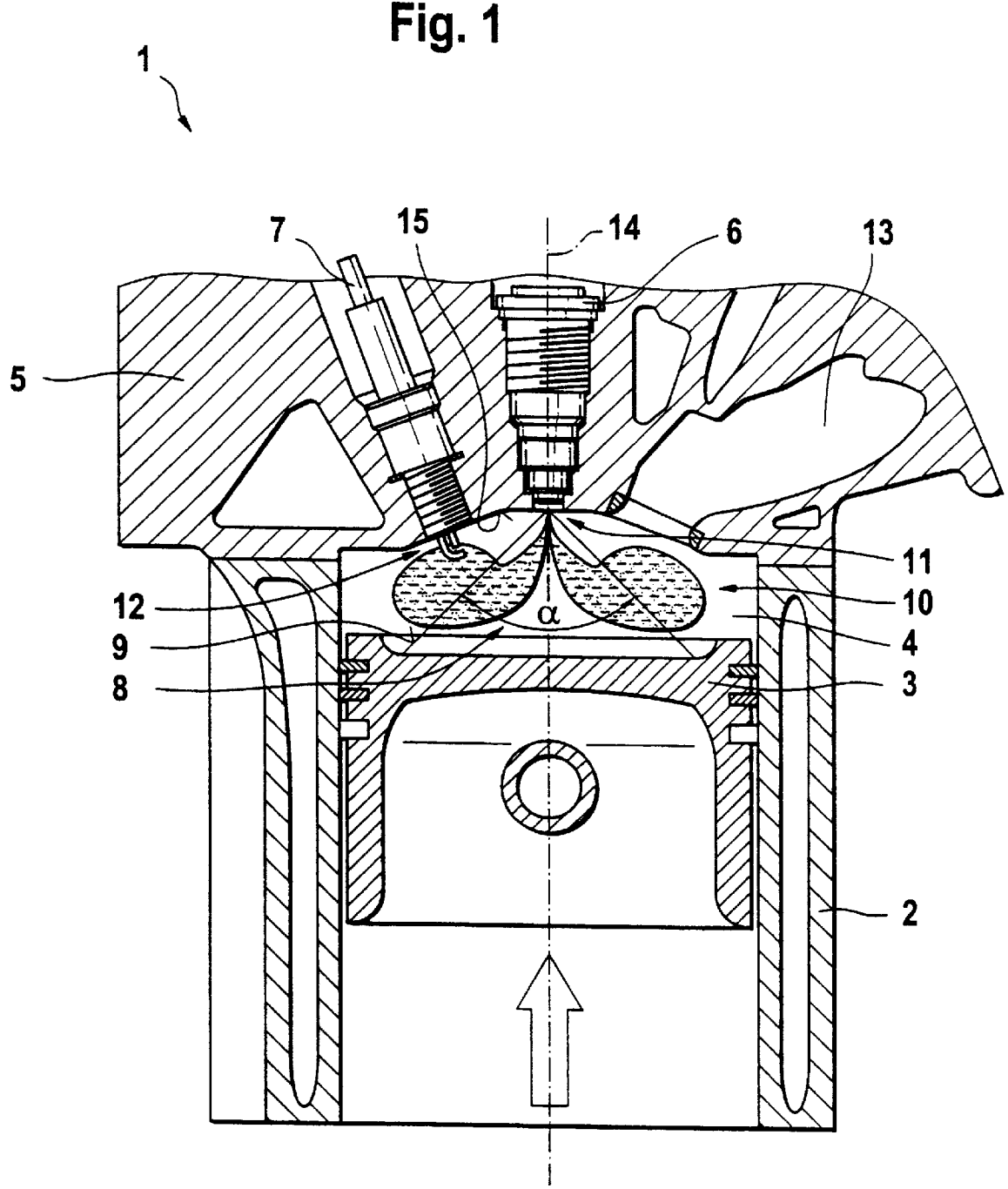
FIG. 1 is a cross-sectional view of a gasoline engine having direct fuel injection according to the present invention.

An example embodiment of the present invention is described in more detail below with reference to FIG. 1.

FIG. 1 illustrates a gasoline engine 1 having direct fuel injection, in the cylinder 2 of which a piston 3 is positioned so that it moves longitudinally and delimits, with inner wall of a cylinder head 5 mounted on cylinder 2, a combustion chamber 4. A fuel injector 6 is located in cylinder head 5 which, located on central axis 14 of the cylinder, injects fuel directly into a combustion chamber 4 directed toward piston 3. The combustion air necessary for the internal mixture formation is supplied to combustion chamber 4 via an inlet channel 13. Furthermore, a spark plug 7 is located in cylinder head 5, the electrodes 12 of which project into combustion chamber 4, with an ignition spark being triggered between electrodes 12 at the point of ignition, which penetrates into combustion chamber 4 during the sparkover of ignitable mixture.

Injector 6 includes an injection nozzle 11 which opens outwardly, generating a fuel jet shaped like a hollow cone which expands outwardly toward the piston. Electrodes 12 of spark plug 7 are outside lateral surface 9 of conical fuel jet 8 generated by injection nozzle 11 and are thus not wetted with fuel during the injection process.

The injector is piezoelectrically actuated, with injection nozzle 11 being rapidly released and closed by a precisely adjustable piezoelement. The formation of the desired free jet shape of the fuel cone is promoted through the appropriate selection of the injection time and its precise observance during the working cycle using the piezoelectric actuation of the injector.

The internal combustion engine operates within wide characteristics map ranges in stratified charge operation, with the fuel being injected during the compression cycle of cylinder 2. Due to the late fuel injection during the working cycle, a stratified combustion chamber charge with locally varying fuel concentrations occurs, with a very lean mixture being formed or pure air existing outside conical fuel jet 8.

In order to bring ignitable mixture between electrodes 12 of spark plug 7, the internal combustion engine has a combustion chamber configuration such that conical fuel jet 8 is injected in a free jet, substantially uninfluenced by the combustion chamber perimeter by cylinder head inner wall 15. Lateral surface 9 of conical fuel jet 8 may be at a great distance from inner wall 15, with fuel vortices 10, which extend out of lateral surface 9, forming in the free jet, decoupled from the wall influence of the combustion chamber perimeter. The opening angle a of conical fuel jet 8 is between 70° and 100°, with the fuel vortex being particularly pronounced at the edge of the cone.

Fuel vortices 10 occur due to an air current in the region of lateral surface 9 of the conical fuel jet through air entrained by the fuel jet, with an air current being also generated in opposite direction by the partial vacuum which occurs. Fuel vortices 10 transport fuel into combustion chamber regions disposed far outside conical fuel jet 8 and mix with the combustion air.

The spark plug is located so that electrodes 12 project into mixture vortex 10. Even in the combustion chamber region disposed outside conical fuel jet 8, in which the electrodes are protected from direct wetting with fuel, ignitable mixture may thus be provided at spark plug 7 with fuel vortices 10 present during free jet injection.

Fuel vortices 10 are formed substantially independently of the shape of the combustion chamber, and inner wall 15 of cylinder head 5 may therefore be arranged and configured as desired. The free injection jet has the shape of a hollow cone, which carries a large portion of the total quantity of fuel injected in lateral surface 9 of conical jet 8, so that they may be covered by fuel vortices 10. The time of ignition may be varied within a wide range, substantially independently of the time of injection, and may be adjusted if necessary, because the fuel vortices are stably pronounced in the combustion chamber over a long period of time and fuel is still present at spark plug 7 approximately 50 degrees crankshaft angle after the injection.

Due to the stability of fuel vortices 10 and the long period of time available for ignition, spark plug 7 may be located at a relatively great distance in the cylinder head from injector 6, which greatly simplifies the combustion chamber configuration and the constructive arrangement of cylinder head 5. The distance of the spark position corresponding to the location of electrodes 12 relative to the injection nozzle may be between 7 mm and 30 mm. The spark position is between 1 mm and 15 mm from lateral surface 9 of conical fuel jet 8. The distance of electrodes 12 to conical fuel jet 8 is selected according to the desired operating behavior in the respective application of gasoline engine 1 having direct fuel injection.

What is claimed is:

1. A gasoline engine having direct fuel injection, comprising:
   a combustion chamber delimited in each cylinder by a longitudinally movable piston and an inner wall of a cylinder head;
   an injector having an injection nozzle configured to inject fuel in a conical shape into the combustion chamber to form an ignitable fuel/air mixture with separately supplied combustion air; and
   a spark plug having electrodes arranged outside a lateral surface of a conical fuel jet generated by the injection nozzle in a region of a mixture vortex;
   wherein the combustion chamber is configured so that the fuel is injected in a form of a free jet having a hollow cone shape;
   wherein the fuel jet is substantially uninfluenced by a combustion chamber perimeter so that fuel vortices form substantially independently of a shape of the combustion chamber; and
   wherein the electrodes of the spark plug project into a fuel vortex that develops from the lateral surface of the free jet during injection.

2. The gasoline engine according to claim 1, wherein an opening angle of the conical fuel jet is between 70° and 100°.

3. The gasoline engine according to claim 1, wherein a spark position of the electrodes is 1 mm to 15 mm from the lateral surface of the conical fuel jet.

4. The gasoline engine according to claim 1, wherein the injector includes an injection nozzle opening outwardly.

5. The gasoline engine according to claim 4, wherein a spark position of the electrodes is 7 mm to 30 mm from the injection nozzle.

6. The gasoline engine according to claim 1, wherein the injector is configured to be operated piezoelectrically.

7. The gasoline engine according to claim 1, wherein the gasoline engine is configured to be operated within broad characteristics map ranges with stratified charging and fuel injection during a compression cycle.

* * * * *